United States Patent [19]

Zander

[11] Patent Number: 5,296,887
[45] Date of Patent: Mar. 22, 1994

[54] BAR-CODED FILM SPOOL

[75] Inventor: Dennis R. Zander, Penfield, N.Y.

[73] Assignee: Eastman Kodak Company, Rochester, N.Y.

[21] Appl. No.: 81,533

[22] Filed: Jun. 23, 1993

[51] Int. Cl.⁵ .......................................... G03B 17/26
[52] U.S. Cl. ...................................... 354/275; 354/21
[58] Field of Search ............... 354/21, 275; 352/78 C; 242/71.1, 71.2; 235/458, 462, 463

[56] References Cited

U.S. PATENT DOCUMENTS

| | | | |
|---|---|---|---|
| 3,276,340 | 10/1966 | Nerwin | 354/275 X |
| 3,309,975 | 6/1967 | Kremp et al. | 354/21 |
| 3,490,348 | 1/1970 | Ariyasu et al. | 242/71.1 |
| 3,599,550 | 8/1971 | Kaneko | 354/21 X |
| 3,666,361 | 5/1972 | Pankow et al. | 354/275 X |
| 4,928,900 | 5/1990 | Beery | 242/71.1 |
| 5,023,642 | 6/1991 | Pagano | 354/275 |
| 5,030,978 | 7/1991 | Stoneham et al. | 354/21 |
| 5,032,854 | 7/1991 | Smart et al. | 354/21 |
| 5,079,565 | 1/1992 | Shimizu et al. | 346/76 PH |

Primary Examiner—Michael L. Gellner
Assistant Examiner—Howard B. Blankenship
Attorney, Agent, or Firm—Roger A. Fields

[57] ABSTRACT

A rotatable film spool comprises a bar-coded disk with a bar code symbol consisting of a sequence of lesser and greater photo reflective elements having various widths. According to the invention, the lesser photo reflective elements are respective cut-outs in the disk and the greater photo reflective elements are respective flat segments of the disk between adjacent pairs of the cut-outs. By making the lesser photo reflective elements of the bar code symbol respective cut-outs in the disk and the greater photo reflective elements respective flat segments of the disk between adjacent pairs of the cut-outs, it is generally assured that the bar code symbol will be critically located because the various elements are an integral part of the disk.

5 Claims, 7 Drawing Sheets

BAR-CODED FILM SPOOL

FIELD OF THE INVENTION

The invention relates generally to the field of photography, and in particular to bar-coded film spools. More specifically, the invention relates to a film spool having a bar code symbol that provides film-related information.

BACKGROUND OF THE INVENTION

Various bar code symbols are widely used to label items for product identification or other purposes. Generally speaking, a bar code symbol consists of a sequence of light and dark regions referred to as elements or bars. These elements are typically rectangular in shape and often have a variety of possible widths. An arrangement of elements represents a character and is determined according to a set of rules and definitions typically referred to as a "code". A variety of codes such as the Universal Product Code (UPC) and Code 39 exist and provide a degree of conformity.

More specifically, codes define a set of characters wherein each character is depicted and defined by a unique arrangement of elements. To encode a desired message having a number of characters, a collection of arrangements of elements are concatenated to form a bar code symbol. Each character of the message is represented by its own corresponding group of elements.

In the field of photography, it is known for a rotatable film spool to include a coaxial disk having a bar code symbol which consists of a sequence of white and black bars or elements. For example, see commonly assigned U.S. Pat. No. 5,023,642, issued Jun. 11, 1991, No. 5,030,978, issued Jul. 9, 1991, and No. 5,032,854, issued Jul. 16, 1991. The black bars are printed in spaced relation on an otherwise white bar code label that is adhered to the spool disk. The bar code symbol that results is used to provide film-related information, such as film speed (ISO), film type, total number of film exposures available, etc..

PROBLEM TO BE SOLVED BY THE INVENTION

Often, as in the example of the bar-coded film spool disclosed in the foregoing patents, there is a need to have the bar code symbol critically located with respect to the spool core. However, it is possible that when the bar code label is adhered to the spool disk the label may be improperly located.

SUMMARY OF THE INVENTION

According to the invention, a rotatable film spool comprising a bar-coded disk with a bar code symbol consisting of a sequence of lesser and greater photo reflective elements having various widths, is characterized in that:

the lesser photo reflective elements are respective cut-outs in the disk and the greater photo reflective elements are respective flat segments of the disk between adjacent pairs of the cut-outs.

ADVANTAGEOUS EFFECT OF THE INVENTION

By making the lesser photo reflective elements of the bar code symbol respective cut-outs in the disk and the greater photo reflective elements respective flat segments of the disk between adjacent pairs of the cut-outs, it is generally assured that the bar code symbol will be critically located because the various elements are an integral part of the disk.

DETAILED DESCRIPTION OF THE INVENTION

The invention is disclosed as being embodied preferably in a film cassette. Because the features of a film cassette are generally known as shown in prior art U.S. Pat. No. 5,122,820, the description which follows is directed in particular to elements forming part of or cooperating directly with the invention. It is to be understood, however, that other elements not specifically shown or described may take various forms known to persons of ordinary skill in the art.

The Film Cassette—General

Figure 1:
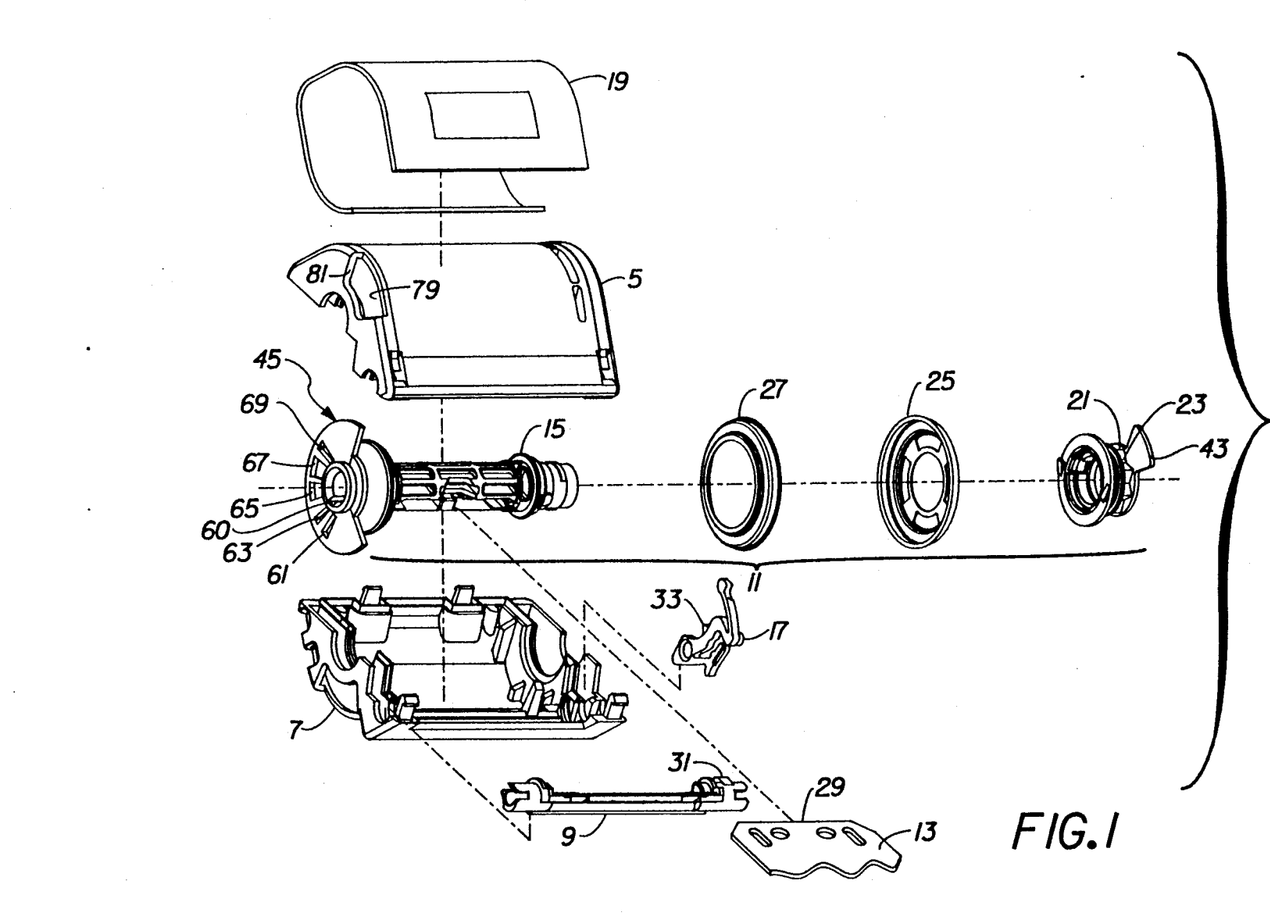
FIG. 1 is an exploded perspective view of a film cassette including a bar-coded film spool in accordance with a preferred embodiment of the invention.
Figure 4:
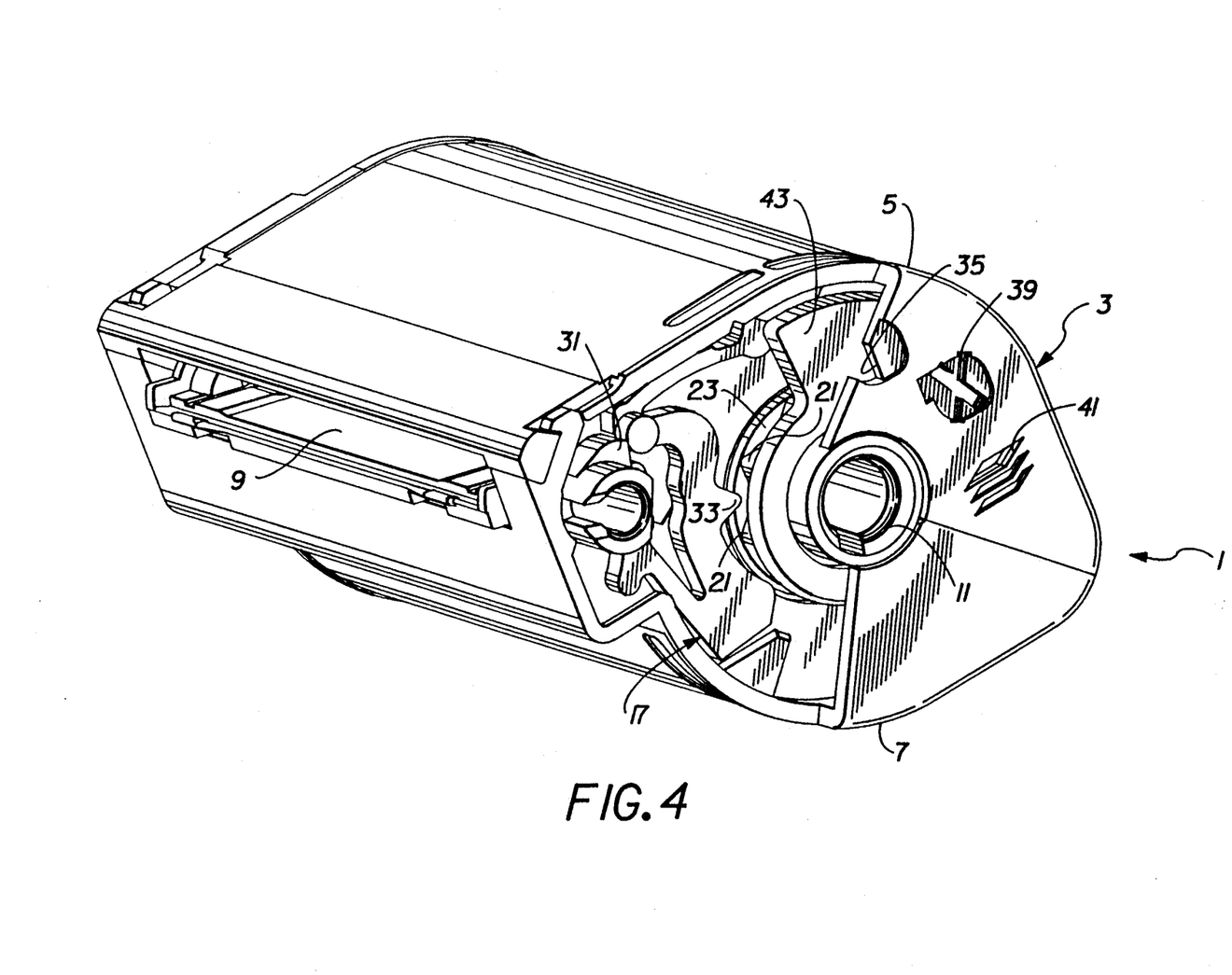
FIG. 4 is an assembled perspective view of the film cassette depicted with part of the cassette shell cut away to show a spool lock.

Referring now to the drawings, FIG. 1 is an exploded perspective view of a film cassette 1 in accordance with a preferred embodiment of the invention, and FIG. 4 is an assembled perspective view of the film cassette depicted partly cut away to show certain details of its interior. Generally, the film cassette 1 comprises a cassette shell 3 constructed of carbon-black plastic material and made up of two mating shell halves 5 and 7, a similarly constructed light-shielding door 9 closed to prevent ambient light from entering the cassette interior through a film egress/ingress slot located between the two shell halves and opened to permit film movement into and out of the cassette interior via the film egress/ingress slot, a film spool 11 supported for rotation inside the cassette shell in opposite film unwinding and film winding directions to unwind a filmstrip 13 off the spool core 15 and to wind the filmstrip onto the spool core, a spool lock 17 for engaging the spool core to prevent rotation of the film spool and out of engagement to release the film spool, and a cassette covering label 19.

Figure 5:
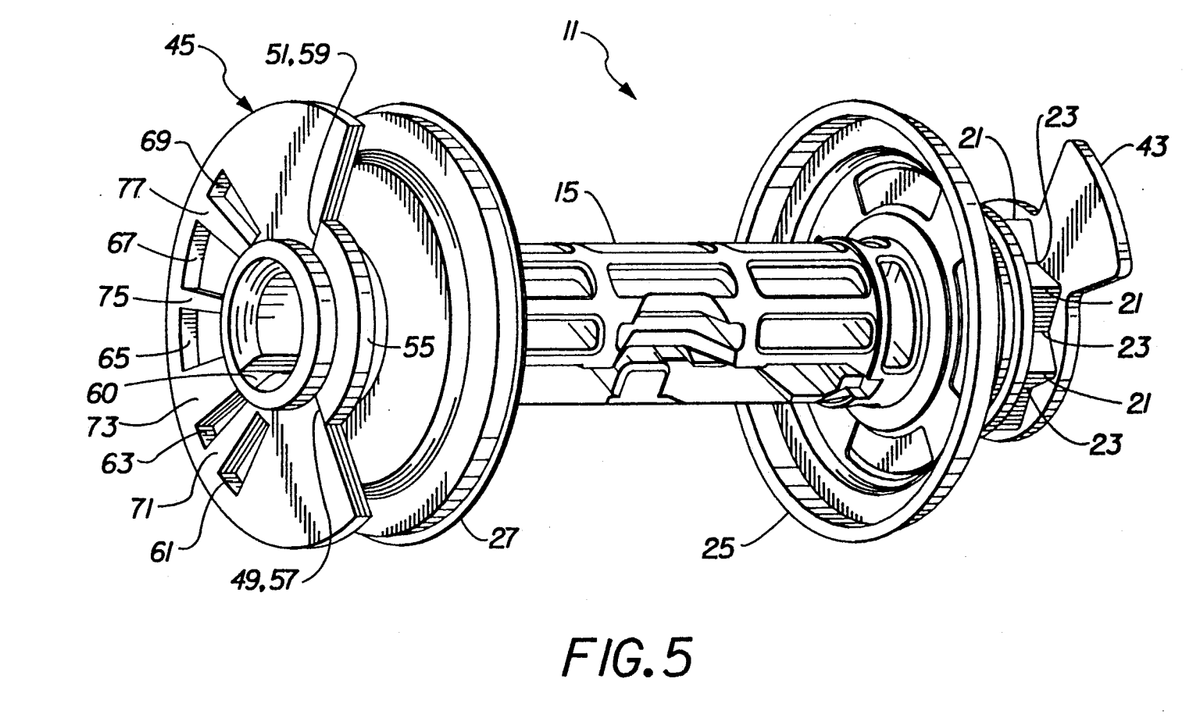
FIG. 5 is an assembled perspective view of the bar-coded film spool.

The spool core 15 as shown in FIGS. 1, 4, and 5 has a toothed periphery consisting of successive symmetrical teeth 21 separated by interdental spaces 23, and it supports a pair of coaxial flanged disks 25 and 27 between which the filmstrip 13 is stored in roll form. A trailing or inner end 29 of the filmstrip 13 is attached to the spool core 15.

The light-shielding door 9 as shown in FIGS. 1 and 4 includes integral cam means 31 for pivoting the spool lock 17 to a locking position as the door is closed. When the spool lock 17 is in its locking position, not shown, an integral detent 33 of the spool lock is located in anyone of the interdental spaces 23 between two adjacent teeth 21 of the spool core 17 to secure the film spool 11 in anyone of a number of rotational orientations equal to the number of interdental spaces. If the light-shielding door 9 is opened as shown in FIG. 4, its cam means 31 is retracted from the spool lock 17. As a result, forcible rotation of the film spool 11 in the film winding or film unwinding direction will cause one of the two adjacent teeth 21 between which the detent 33 is located to eject the detent from the interdental space 23 separating those two teeth. Thus, the spool lock 17 will be pivoted out of its locking position.

The Film Exposure-Status Indicating Means Of The Film Cassette

Figure 3:
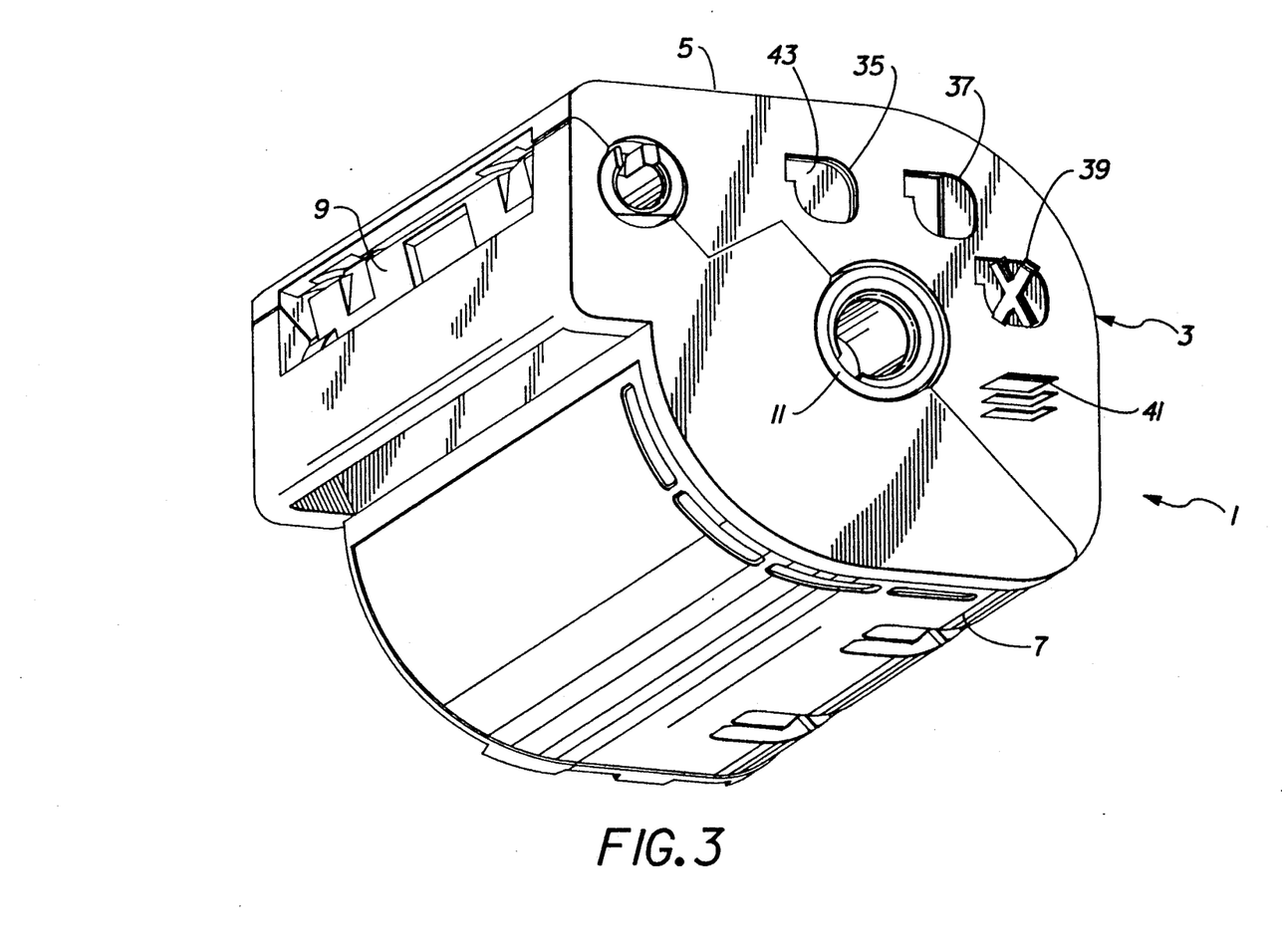
FIG. 3 is an assembled perspective view of the film cassette as seen from another end of the cassette shell.

The shell half 5 at one of its ends has four icons in the form of respective cut-outs 35, 37, 39, and 41 shown in FIG. 3. The cut-out 35 is designed to effect an indication that the filmstrip 13 is fresh or unexposed. The cut-out 37 is designed to effect an indication that the filmstrip 13 is partly exposed (and partly unexposed). The cut-out 39 is designed to effect an indication that the filmstrip 13 is fully exposed. The cut-out 41 is designed to effect an indication that the filmstrip 13 has been processed in a film processing machine to develop the latent images on the exposed film.

An indicator flag 43 is coaxially fixed to the spool core 15 as shown in FIGS. 1 and 5, to be rotated with the film spool 11 in the film unwinding and film winding directions. Initially the flag 43 is secured with the film spool 11 in a rotational orientation that locates the flag immediately beneath the cut-out 35 as shown in FIG. 3, to be visible to provide an indication that the filmstrip 13 is fresh or unexposed. Conversely, when the flag 43 is secured with the film spool 11 in a rotational orientation that locates the flag immediately beneath the cut-out 37, it is visible to provide an indication that the filmstrip 13 is partly exposed (and partly unexposed). When the flag 43 is secured with the film spool 11 in a rotational orientation that locates the flag immediately beneath the cut-out 39, it is visible to provide an indication that the filmstrip 13 is fully exposed. When the flag 43 is secured with the film spool 11 in a rotational orientation that locates the flag immediately beneath the cut-out 41, it is visible to provide an indication that the filmstrip 13 has been processed.

The Bar-coded Film Spool

Figure 6:
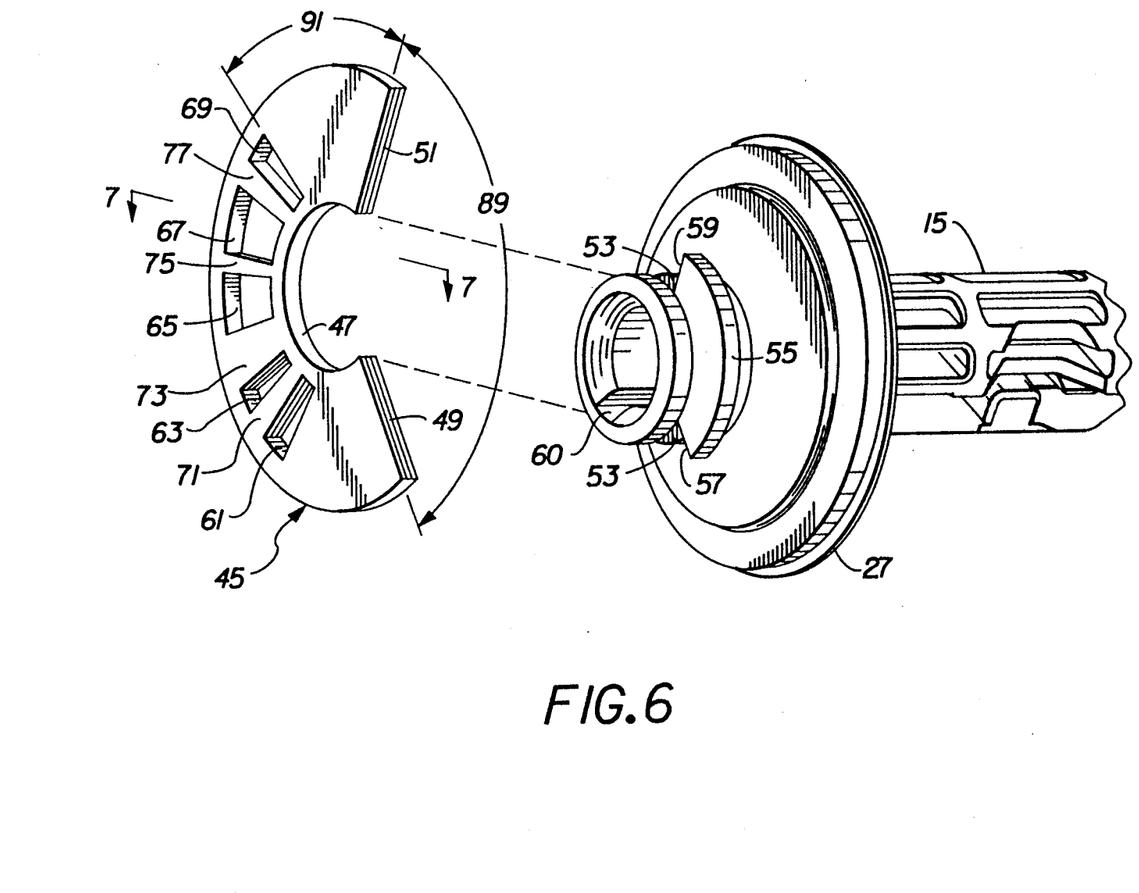
FIG. 6 is an exploded perspective view of part of the bar-coded film spool depicted in FIG. 5.

According to the invention, the film spool 11 as shown in FIGS. 1, 5 and 6 includes a white-pigmented plastic disk 45 having a semi-circular configuration, i.e. "c"-shaped, a central opening 47, and a pair of extreme ends 49 and 51. The spool core 11 longitudinally extends through the central opening 47 of the disk 45 and has a peripheral groove 53 in which the disk is seated to secure the disk and the spool core coaxially together. A registration stop 55 is fixed to the spool core 15 adjacent the peripheral groove 53 and has a pair of stop ends 57 and 59 arranged to abut the extreme ends 49 and 51 of the disk 45 to critically orient the disk with respect to a key slot 60 in the spool core 15. See FIGS. 5 and 6.

The disk 45 has a sequence of several various width cut-outs 61, 63, 65, 67, and 69 and respective various width flat segments 71, 73, 75, and 77 between adjacent pairs of the cut-outs, which comprise a bar code symbol indicative of the film speed (ISO) of the filmstrip 13. The flat segments 71, 73, 75, and 77 are the equivalent of the light regions or white bars of a typical bar code and the cut-outs 61, 63, 65, 67, and 69 are analogous to the dark regions or black bars of a typical bar code symbol.

Figure 2:
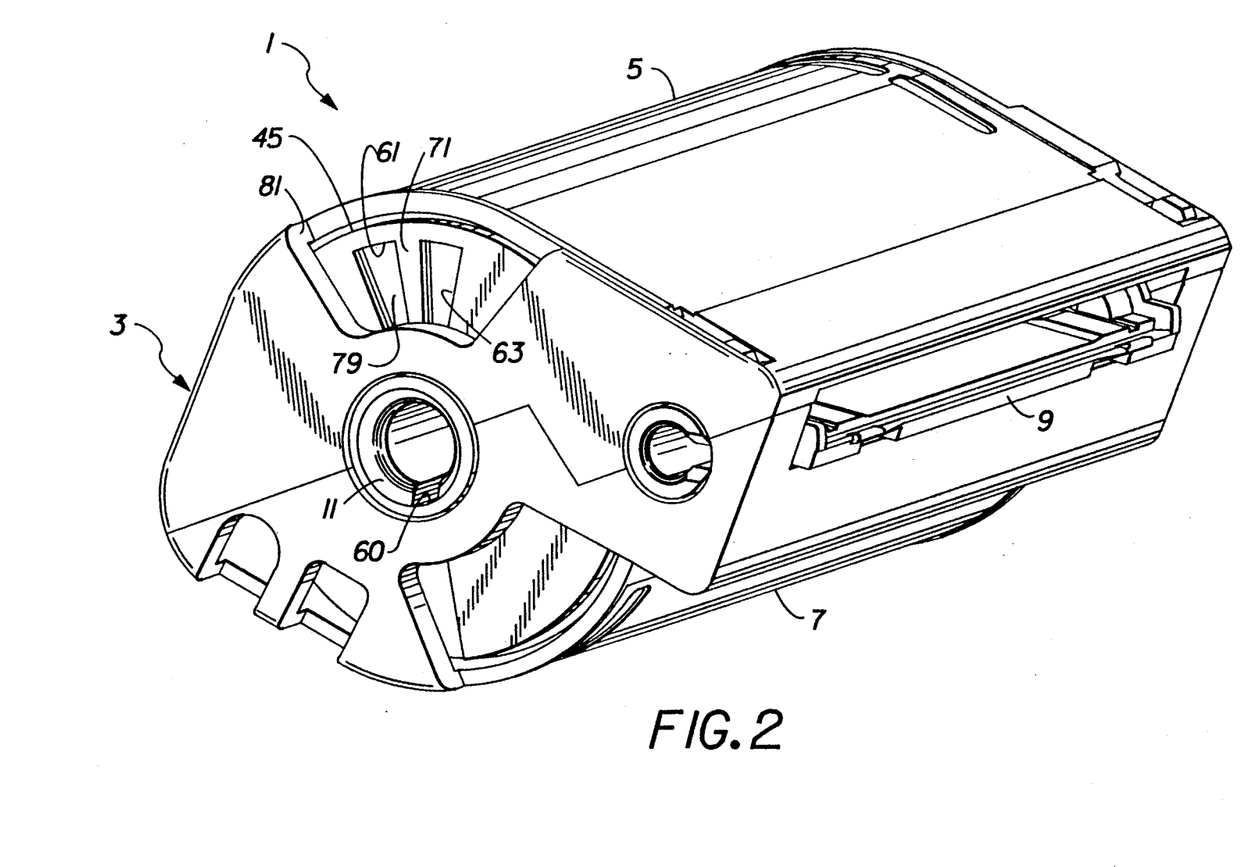
FIG. 2 is an assembled perspective view of the film cassette as seen from one end of the cassette shell.
Figure 7:
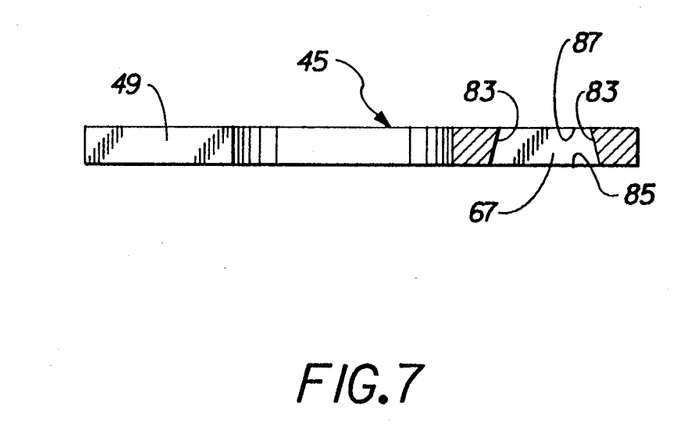
FIG. 7 is a sectional view as seen in the direction of the arrows 7, 7 in FIG. 6.

When the film spool 11 is rotated in the film unwinding and winding directions, the disk 45 will circle over an integral ledge portion 79 of the shell half 5. As can be seen in FIGS. 1 and 2, the integral ledge portion 79 extends under a window 81 in the shell half 5. The viewing window 81 is intended for optical viewing of successive sections of the disk 45, including its cut-outs 61, 63, 65, 67, and 69 and its flat segments 71, 73, 75 and 77. The cut-outs 61, 63, 65, 67, and 69 have respective pairs of beveled sides 83 as shown in FIG. 7, which provide greater width openings 85 and lesser width openings 87 for each of the cut-outs. The greater width openings 85 are located to face the integral ledge portion 79 and the lesser width openings 87 are located to face the viewing window 81 as the respective cut-outs 61, 63, 65, 67, and 69 advance beneath the viewing window. Consequently, for viewing purposes, there is provided a sharp or rapid change of state between adjacent ones of the cut-outs 61, 63, 65, 67, and 69 and the flat segments 71, 73, 75, and 77 because the beveled sides 83 of each of the cut-outs reduce the side wall reflection of the cut-outs as seen from the viewing window.

The extreme ends 49 and 51 of the disk 45 are separated by a void or gap 89 having a first predetermined length as shown in FIG. 6. Conversely, the extreme end 51 is separated from the cut-out 69 by a flat segment 91 of the disk having a second predetermined length that is less than the first predetermined length. The first and second predetermined lengths are chosen in order that when considered in proportion to one another they provide a ratio encodement indicative of the total number exposures available on the filmstrip 13.

The invention has been described with reference to a preferred embodiment. However, it will be appreciated that variations and modifications can be effected by persons of ordinary skill in the art without departing from the scope of the invention.

Parts List For FIGS. 1-7

1. film cassette
3. cassette shell
5 & 7. shell halves
9. light-shielding door
11. film spool
13. filmstrip
15. spool core
17. spool lock
19. covering label
21. spool teeth
23. interdental spaces
25 & 27. spool disks
29. trailing film end
31. camming means of door
33. detent of spool lock
35, 37, 39, & 41. four icon cut-outs
43. flag
45. bar-coded disk
47. central opening
49 & 51. extreme ends
53. peripheral groove
55. registration stop
57 & 59. stop ends
60. key slot
61, 63, 65, 67, & 69. cut-outs
71, 73, 75, & 77. flat segments 79. integral ledge portion
81. viewing window
83. beveled sides
85. greater width opening
87. lesser width opening
89. gap
91. flat segment

I claim:

1. A rotatable film spool comprising a bar-coded disk with a bar code symbol consisting of a sequence of lesser and greater photo reflective elements having various widths, is characterized in that:
said lesser photo reflective elements are respective cut-outs in said disk and said greater photo reflective elements are respective flat segments of the disk between adjacent pairs of said cut-outs.

2. A rotatable film spool as recited in claim 1, wherein said cut-outs in the disk have beveled sides in order to provide lesser width openings for each of the cut-outs at one side of said disk and greater width openings for each of the cut-outs at an opposite side of the disk.

3. A rotatable film spool as recited in claim 2, wherein a spool core and said disk are coaxially secured together proximate one end of said spool core with said lesser width openings for each of the cut-outs facing in the same direction as said end of the spool core and with said greater width openings for each of the cut-outs facing in an opposite direction.

4. A rotatable film spool as recited in claim 1, wherein said disk has a semi-circular configuration and includes a central opening and a pair of extreme ends, a spool core extends through said central opening of the disk and has a peripheral groove in which said disk is seated to secure the disk and said spool core coaxially together, and a registration stop is fixed to said spool core adjacent said peripheral groove and has a pair of stop ends arranged to abut said extreme ends of the disk to critically orient said bar code symbol with respect to the spool core.

5. A rotatable film spool as recited in claim 4, wherein said extreme ends of the disk are separated by a void having a first predetermined length, and one of said extreme ends of the disk and a cut-out in said disk closest to that end are separated by a flat segment of the disk having a second predetermined length which when considered in proportion to said first predetermined length provides a ratio encodement indicative of the total number of exposures available on a filmstrip coiled about said spool core.

* * * * *